(12) United States Patent
Locatelli et al.

(10) Patent No.: US 11,015,742 B2
(45) Date of Patent: May 25, 2021

(54) CABLE FASTENING ASSEMBLY AND METHOD FOR USING SAME

(71) Applicant: A. Raymond et Cie., Grenoble (FR)

(72) Inventors: Julien Locatelli, Rochester Hills, MI (US); James Nagle, Rochester, MI (US)

(73) Assignee: A. Raymond et Cie, Grenoble (FR)

( * ) Notice: Subject to any disclaimer, the term of this patent is extended or adjusted under 35 U.S.C. 154(b) by 564 days.

(21) Appl. No.: 15/927,400

(22) Filed: Mar. 21, 2018

(65) Prior Publication Data

US 2019/0293209 A1 Sep. 26, 2019

(51) Int. Cl.
*F16L 3/12* (2006.01)
*F16L 3/233* (2006.01)
*H02G 3/30* (2006.01)

(52) U.S. Cl.
CPC ........... *F16L 3/2334* (2013.01); *F16L 3/1211* (2013.01); *H02G 3/30* (2013.01)

(58) Field of Classification Search
CPC ....... H02G 3/30; B60R 16/0215; F16L 3/233; F16L 3/2334; F16L 3/1211; F16B 37/0842
USPC ...................................................... 248/74.3
See application file for complete search history.

(56) References Cited

U.S. PATENT DOCUMENTS

| | | | |
|---|---|---|---|
| 2,250,072 A * | 7/1941 | Tinnerman | F16B 5/10 411/549 |
| 2,803,201 A | 8/1957 | Johnson et al. | |
| 3,454,249 A | 7/1969 | Geisinger | |
| 3,632,071 A | 1/1972 | Cameron et al. | |
| 3,913,876 A * | 10/1975 | McSherry | H02G 3/32 248/74.3 |
| 4,488,333 A | 12/1984 | Tracy | |
| 4,666,355 A * | 5/1987 | Stover | F16B 37/046 411/104 |
| 4,768,741 A | 9/1988 | Logsdon | |
| 4,799,298 A | 1/1989 | Matoba | |
| D329,588 S | 9/1992 | Michel, Jr. | |
| 5,315,774 A | 5/1994 | Chompff | |
| D347,782 S | 6/1994 | Wentzel | |
| 5,332,179 A | 7/1994 | Kuffel et al. | |

(Continued)

FOREIGN PATENT DOCUMENTS

| | | |
|---|---|---|
| EP | 1462699 | 9/2004 |
| EP | 1772935 | 4/2007 |
| FR | 3001837 | 8/2014 |

*Primary Examiner* — Bradley Duckworth
(74) *Attorney, Agent, or Firm* — Warner Norcross + Judd LLP (57) ABSTRACT

The disclosed inventive concept provides a cable fastener assembly for securing a plurality of cables onto a stud. The cable fastener assembly includes a housing and a punch-nut for securing the housing onto the stud. The housing includes a base, a sidewall, and at least one attachment member extending from the sidewall. The base has an opening formed therein for receiving the stud and the sidewall includes at least one attachment member for securing a cable tie thereto. The punch-nut includes a base and an opening formed therein for receiving the stud. By providing interchangeable punch-nuts to be used with the housing, the disclosed inventive concept can accommodate studs having different shapes. Preferably, a pair of perpendicular passageways is formed within each attachment member. A cable tie may then be secured within each passageway for securing cables to the housing along different axes.

19 Claims, 10 Drawing Sheets

(56) References Cited

U.S. PATENT DOCUMENTS

| | | | | |
|---|---|---|---|---|
| 5,390,882 A | * | 2/1995 | Lee | B60R 11/00 24/16 R |
| 5,546,280 A | | 8/1996 | Hasebe et al. | |
| 5,604,958 A | | 2/1997 | Anscher | |
| 5,820,083 A | * | 10/1998 | Geiger | F16L 3/123 248/74.3 |
| 5,906,464 A | | 5/1999 | Wedenig | |
| 5,934,465 A | | 8/1999 | Abbruzzese et al. | |
| 6,082,577 A | | 7/2000 | Coates et al. | |
| 6,149,109 A | | 11/2000 | Stankowski | |
| 6,179,539 B1 | * | 1/2001 | Benoit | F16B 37/0842 411/278 |
| 6,196,751 B1 | | 3/2001 | Khokhar | |
| 7,066,701 B2 | * | 6/2006 | Kovac | F16B 37/0842 411/433 |
| 8,042,774 B2 | | 10/2011 | Davis et al. | |
| 9,004,417 B2 | | 4/2015 | Elsner et al. | |
| D734,654 S | | 7/2015 | Geiger | |
| 9,190,821 B2 | * | 11/2015 | Kwasiborski | F16B 37/0842 |
| 9,425,598 B2 | * | 8/2016 | Yoshida | B60R 16/0215 |
| 9,689,511 B1 | * | 6/2017 | Thornton | F16B 5/02 |
| 9,735,559 B2 | * | 8/2017 | Ehrenfels | H02G 3/02 |
| 10,096,934 B1 | * | 10/2018 | Desjardins | H01R 13/5841 |
| 10,323,774 B2 | * | 6/2019 | Van Hulst | F16B 37/0857 |
| 10,399,516 B2 | * | 9/2019 | Chapman | B60R 16/0215 |
| 10,663,089 B2 | * | 5/2020 | Sylvester | F16L 3/221 |
| 2002/0104931 A1 | | 8/2002 | Mascadri | |
| 2005/0103961 A1 | | 5/2005 | Swanstrom et al. | |
| 2006/0169482 A1 | | 8/2006 | Hess et al. | |
| 2010/0084518 A1 | | 4/2010 | Davis et al. | |
| 2010/0104394 A1 | | 4/2010 | Kwasiborski | |
| 2012/0124782 A1 | | 5/2012 | Elsner et al. | |
| 2019/0136895 A1 | * | 5/2019 | Teece | B60R 16/0215 |
| 2020/0200207 A1 | * | 6/2020 | Liebelt | F16B 37/043 |

* cited by examiner

CABLE FASTENING ASSEMBLY AND METHOD FOR USING SAME

TECHNICAL FIELD

The disclosed inventive concept relates to assemblies for fastening cables, wires, and the like to a stud. More particularly, the disclosed inventive concept relates to assemblies having interchangeable components for accommodating studs of various types and sizes. Even more particularly, the disclosed inventive concept pertains to cable fastening assemblies in which groups of cables extending along different axes can be secured to a single stud via cable ties.

BACKGROUND OF THE INVENTION

Motor vehicles include a large number of electrical cables and wires for transmitting signals between various electrical components. Similarly, duct work and other types of machinery also include lengthy cables and wires extending throughout in order to interconnect electrical components. If not properly secured, these cables may obstruct operation of the machinery and become damaged. More importantly, the improperly secured cables may lead to component failure and result in costly repairs. Therefore, cable fasteners are typically employed in these instances in order to ensure that the cables are isolated and remain out of contact with other components within the machinery.

The prior art teaches a number of cable fastener devices for arranging cables in a bundle with the use of a cable tie. For example, U.S. Pat. No. 3,913,876 to McSherry teaches a cable tie support comprising a base for securing the support to a mounting structure and cable tie retaining means for securing a cable tie thereto. The support taught therein may be positioned anywhere along the mounting structure and is capable of securing a plurality of cables by connecting a cable tie to the retaining means. However, the fastener taught therein is limited to utilizing only a single cable tie and orienting the cables along a single axis.

Other devices are taught in the prior art in which the cable fastener is secured to a stud, such as that taught in U.S. Pat. No. 6,196,751 to Khokhar. Khokhar teaches a stud mounted fastener that is screwed onto a stud and includes a plurality of arms for securing multiple cable ties thereto and in different directions. Thus, the cable ties may be oriented in two different directions for extending cables in both an X-axis and a Y-axis. However, the fastener includes an integrally formed abutment member having a plurality of circumferentially disposed tangs for gripping threads of the stud. Thus, the fastener can only be used with a single type and sized stud.

Oftentimes, during production, the exact location of where wires will need to be fastened to a support structure and which type of studs will be required are not known until after production is complete. Therefore, it may be advantageous to provide a cable fastening assembly in which groups of cables extending along different axes may be secured and having interchangeable parts in order to accommodate studs of various types and sizes. As in so many areas of manufacturing technology, there is always room for improvement related to cable fasteners.

SUMMARY OF THE INVENTION

The disclosed inventive concept overcomes the problems associated with known cable fasteners which may be limited to only being used with a single style stud or one that has a single size. The disclosed inventive concept offers the significant general advantage of including interchangeable parts which allow the cable fastener to accommodate studs having different dimensions and configurations.

The disclosed inventive concept provides a cable fastener assembly comprising a housing for receiving a stud and a punch-nut insertable into the housing for securing the housing to the stud. More particularly, the housing includes a base, a sidewall, and at least one attachment member formed on the sidewall for receiving a cable tie. The base includes an opening formed therein for receiving the stud when the housing is placed over the stud.

The punch-nut includes a base and an opening formed therein for receiving the stud. The punch-nut further includes a pair of opposing arms for engaging the stud and maintaining the position of the punch-nut on the stud.

It is to be understood that different punch-nuts may be used interchangeably with the housing based on the type of stud to which the cable fastener assembly is being secured. Thus, when the stud includes a plurality of radially-extending spokes, the opposing arms of the punch-nut each include a distal end having an inwardly-directed V-shape for matingly contacting the spokes on the stud. Alternatively, when the stud does not include a plurality of radially-extending spokes, the distal end of each of the opposing arms has a rounded edge for conforming to the rounded surface of the stud itself. Moreover, when the stud includes an anti-rotation key extending outwardly from the stud, a cutout is formed in the opening in the base of the punch-nut for allowing the stud to extend through the punch-nut and to be fixed in position.

In use, the housing is first positioned over the stud allowing the stud to extend through the opening formed in the base. Thereafter, the punch-nut is positioned over the stud and received within the housing. As the punch-nut is lowered onto the stud, the opposing arms thereof engage the stud in order to retain both the housing and the punch-nut in place. Any number of cable ties may then be connected to respective passageways formed within the attachment member by the cable ties being tightened around a plurality of electrical cables or wires. This prevents the cables from coming in contact with adjacent components and being damaged by such contact.

It is to be understood that the disclosed inventive concept provides a cable fastener assembly which can be used with a number of differently sized and shaped studs for securing a plurality of cables thereto. The above advantages, in addition to other advantages and features, will be readily apparent from the following detailed description of the invention when taken in connection with the accompanying drawings.

BRIEF DESCRIPTION OF THE DRAWINGS

For a more complete understanding of this disclosed inventive concept, reference should now be made to the embodiments illustrated in greater detail in the accompanying drawings and described below by way of examples of the disclosed inventive concept wherein.

DETAILED DESCRIPTION OF THE INVENTION

In the following figures, the same reference numerals will be used to refer to the same components. In the following description, various operating parameters and components are described for different constructed embodiments. These specific parameters and components are included as examples and are not meant to be limiting.

Figure 1:
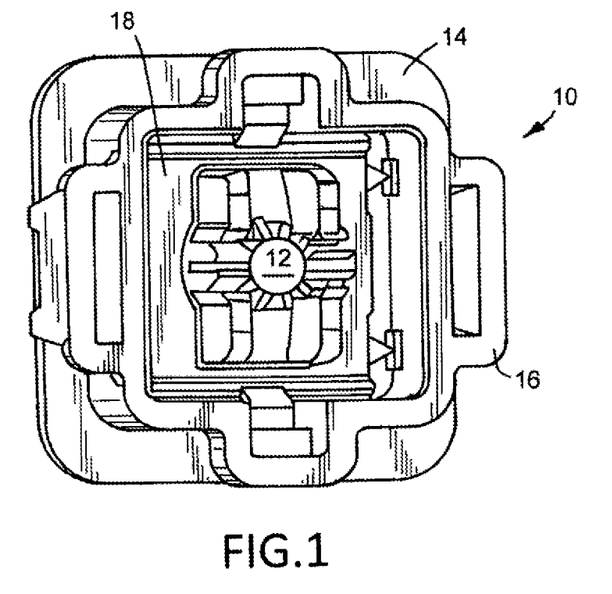
FIG. 1 is a perspective view of a cable fastening assembly including a housing and a punch-nut according to the disclosed inventive concept wherein the assembly is shown secured to a stud.

In accordance with the disclosed inventive concept and with reference to FIG. 1 of the drawings, there is provided a cable fastening assembly 10 for securing a plurality of electrical cables or wires to a stud 12 fixed to a structure 14. Throughout the ensuing description of the disclosed inventive concept, all reference to any cables, wires, or the like will be referred to as a cable generally. As will be discussed in more detail below, the assembly 10 disclosed herein is utilized for fixing the position of the cables to the stud 12 using the cable ties in order to ensure that the cables remain out of contact with other components.

The assembly 10 comprises a housing 16 and a punch-nut 18 insertable into the housing 16. The housing 16 is positionable over the stud 12 such that the stud 12 extends through a central portion of the housing 16. The punch-nut 18 is then insertable into the housing 16 for securing the housing 16 and the punch-nut 18 to the stud 12.

It is to be appreciated that the assembly 10 is capable of being utilized in combination with a variety of different styles of studs. For example, the assembly 10 is capable of receiving and being secured to the stud 12 illustrated in FIG. 2. The stud 12 includes a body 20 fixed to the structure 14 by any suitable means such as mechanical fastening, welding, soldering, adhesives, or the like. It is to be understood that the structure 14 may be any suitable substrate or structure without restricting the scope of the disclosed inventive concept, such as a vehicle frame, glass pane, beam, plastic component, or the like.

Figure 2:
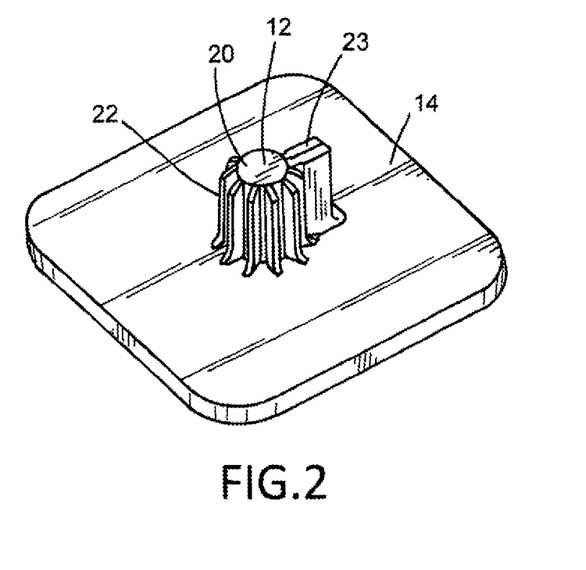
FIG. 2 is a perspective view of the stud of the cable fastening assembly according to the disclosed inventive concept having a plurality of radially-extending spokes and an anti-rotation key.

As shown, the stud 12 includes a plurality of radially-extending, circumferentially disposed spokes 22 and an anti-rotation key 23 extending outwardly therefrom and perpendicular to the body 20. As discussed below, the spokes 22 cause the stud 12 to engage the punch-nut 18 and become tightened while the key 23 restricts rotation of the punch-nut 18 when positioned thereon.

Figure 3:
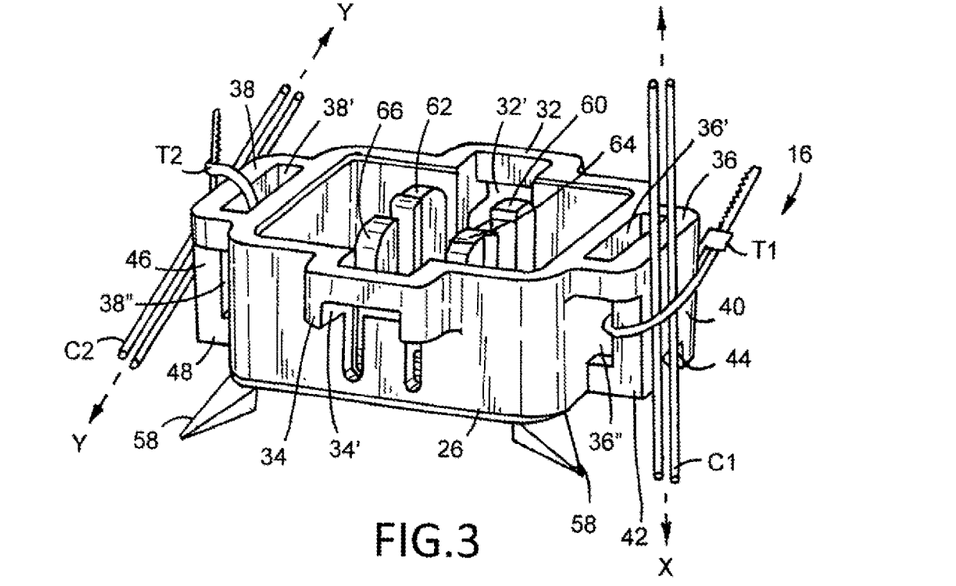
FIG. 3 is a perspective view of the housing of the cable fastening assembly according to the disclosed inventive concept.
Figure 4:
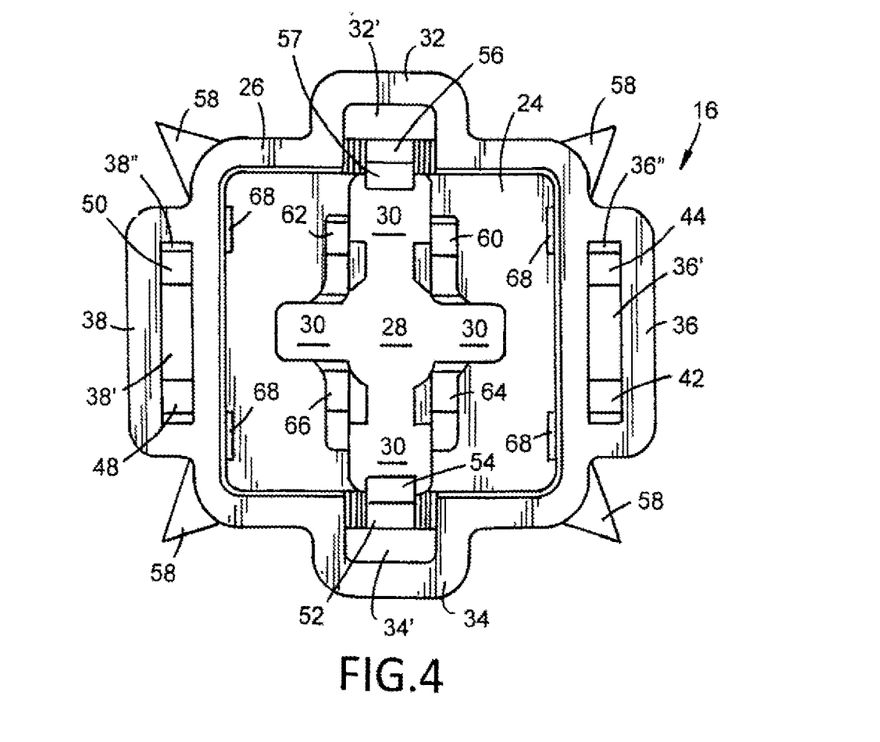
FIG. 4 is a top view of the housing of the cable fastening assembly according to the disclosed inventive concept.

As shown in FIGS. 3 and 4, the housing 16 comprises a base 24 and a sidewall 26 extending substantially perpendicularly therefrom. The base 24 is a planar member including an opening 28 formed in a center portion thereof. The opening 28 may include any desired geometry necessary for adequately receiving the stud 12. In order to receive a stud having at least one anti-rotation key, such as stud 12, the opening 28 includes at least one cutout 30 to receive the anti-rotation key 23. Alternatively, the opening 28 may include a plurality of cutouts 30 and provide a plus-shaped opening 28 for receiving a plurality of respective keys 23. Preferably, the housing 16 is integrally formed from a polymerized material such as plastic.

The housing 16 also comprises at least one U-shaped attachment member 32 extending from the sidewall 26. The attachment member 32 includes at least one passageway 32' formed therein between the sidewall 26 and the attachment member 32. The passageway 32' allows for a cable tie to be attached thereto. By attaching the cable tie, a plurality of cables may be secured to the attachment member 32.

Preferably, the housing 16 includes a plurality of attachment members 32, 34, 36, and 38 each extending from the sidewall 26 and spaced apart from one another. Each attachment member 32, 34, 36, and 38 includes at least one passageway 32', 34', 36', and 38', respectively, for attaching a cable tie thereto. While attachment members 32 and 34 are identical U-shaped members, attachment members 36 and 38 each include additional structure to provide a second passageway for allowing cables to extend along a different axis. Thus, attachment member 36 includes an extension 40 and a pair of spaced apart shoulders 42 and 44 interconnecting the extension 40 and the sidewall 26. Thus, a second passageway 36" is formed perpendicular to the first passageway 36'. The spacing provided between the shoulders 42 and 44 ensures that the first passageway 36' is not obstructed. Similarly, the attachment member 38 includes an extension 46 and a pair of spaced apart shoulders 48 and 50 for providing a second passageway 38'' formed perpendicularly with respect to the first passageway 38'. Preferably, intersecting passageways are substantially perpendicular to one another. However, other arrangements and additional passageways may be provided.

As illustrated in FIG. 3, a first cable tie T1 extends through the passageway 36'' in order to orient a first bundle of cables C1 along a first axis X. A second cable tie T2 extends through the passageway 38' to orient a second bundle of cables C2 along a second axis Y. However, the cable ties T1 and T2, and cables C1 and C2 are only shown for exemplary purposes as it is to be understood that each of the passageways 32', 34', 36', 36'', 38', and 38'' are capable of retaining a cable tie in order to secure either an individual cable or bundle of cables to the housing 16 in a desired orientation.

The housing 16 further comprises at least one retaining finger 52 for securing the punch-nut 18 within the housing 16. The retaining finger 52 is formed within the sidewall 26 of the housing 16 and includes a sloped top surface 54. Due to the housing 16 being formed from a plastic or other suitable material, the retaining finger 52 is slightly flexible with respect to the sidewall 26. Thus, as the punch-nut 18 is lowered onto the housing 16 and contacts the sloped top surface 54 of the retaining finger 52, as described below, the retaining finger 52 is pushed outwardly which allows the punch-nut 18 to be completely lowered onto the base 24 of the housing 16. Once lowered, the retaining finger 52 flexes back to its original position and secures the punch-nut 18 thereon. Preferably, the housing 16 includes a pair of retaining fingers 52 and 56 formed in opposite portions of the sidewall 26 for more efficiently securing the punch-nut 18 within the housing 16. Each retaining finger 52 and 56 includes a sloped top surface 54 and 57, respectively.

The housing 16 may include additional features that facilitate a more stable connection on the stud 12 and the structure 14. For example, the housing 16 may include a plurality of resilient legs 58 extending from either the base 24 or the sidewall 26. The legs 58 are utilized for stabilizing the housing 16 when secured to a structure that is not uniformly planar in order to prevent the housing 16 from rocking. Thus, the legs 58 are preferably spring-loaded or formed from a deformable and resilient material in order to conform to the geometry of the structure 14 and flex back to its original position when removed therefrom. It is to be understood that the legs 58 may comprise any suitable shape, structure, and material without being limited to the triangular configuration illustrated in FIGS. 3 and 4.

Preferably, the housing 16 further comprises at least a pair of upstanding guiding ribs 60 and 62 for stabilizing the punch-nut 18 on the housing 16 and preventing rattling, as described in more detail below. More preferably, the housing 16 comprises a plurality of guiding ribs 60, 62, 64, and 66 for more efficient stabilization of the entire punch-nut 18.

For further stabilization of the punch-nut 18 while mounted onto the housing 16, the housing 16 preferably comprises a plurality of projections 68 extending inwardly from the sidewall 26. As described below, the projections 68 contact a portion of the punch-nut 18 for preventing the punch-nut 18 from moving within the housing 16.

Figure 5:
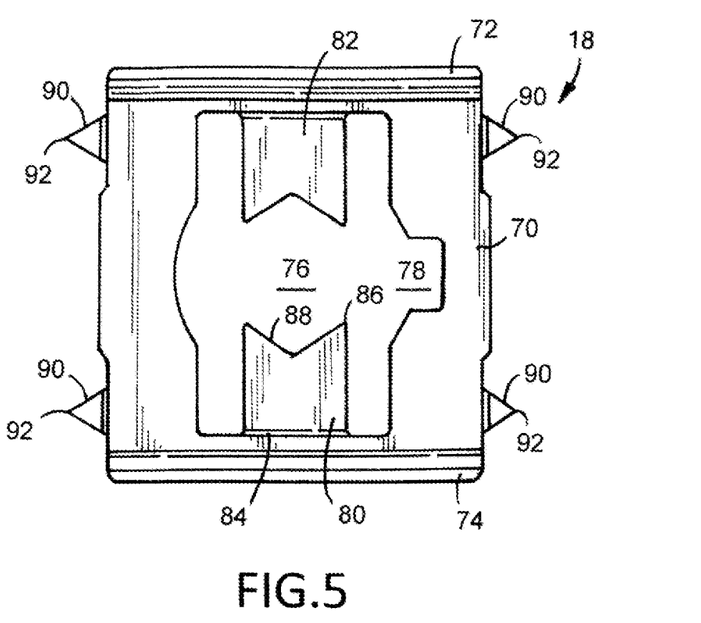
FIG. 5 is a top view of the punch-nut of the cable fastening assembly according to the disclosed inventive concept.
Figure 6:
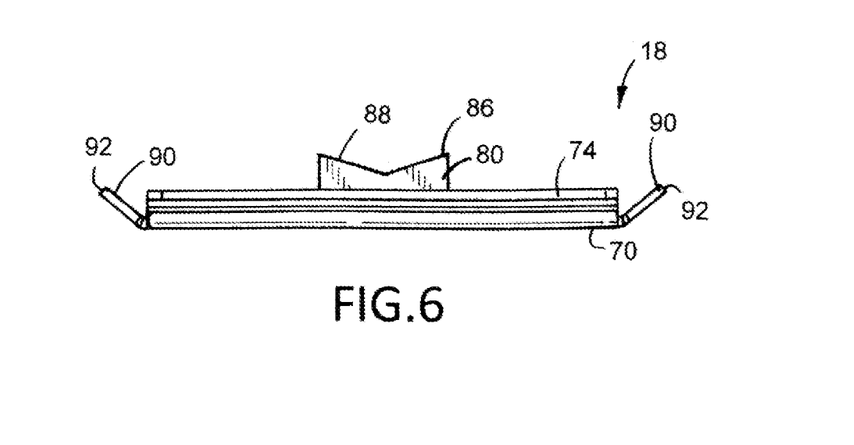
FIG. 6 is a side view of the punch-nut of the cable fastening assembly according to the disclosed inventive concept.

With respect to the punch-nut 18 as shown in FIGS. 5 and 6, the punch-nut 18 includes a base 70 and a pair of opposing ledges 72 and 74 extending upwardly from opposite sides of the base 70. The base 70 has an opening 76 formed therein for receiving the stud 12. The opening 76 also includes at least one cutout 78 formed therein for receiving the anti-rotation key 23 of the stud 12. The opening 76 formed in the punch-nut 18 is coaxially aligned with the opening 28 formed in the housing 16 such that when the punch-nut 18 is positioned on top of the housing 16, the two openings 28 and 76 are aligned with one another for receiving the stud 12.

As discussed above, the housing 16 includes at least one and preferably a pair of retaining fingers 52 and 56 for engaging the punch-nut 18. The ledges 72 and 74 of the punch-nut 18 are responsible for causing the fingers 52 and 56 to flex backward upon contact and subsequently snap back over the ledges 72 and 74, thereby securing the punch-nut 18 within the housing 16.

The punch-nut 18 further comprises a pair of inwardly-directed arms 80 and 82 extending from outer edges of the opening 76 formed in the base 70. The arms 80 and 82 are configured to contact the stud 12 and retain the punch-nut 18 in position with respect thereto. As a result of the housing 16 being secured to the punch-nut 18, the entire assembly 10 remains secured to the stud 12. The arms 80 and 82 are identical and thus only arm 80 will be described in detail.

The arm 80 includes a proximal end 84 at the base 70 of the punch-nut 18 and a distal end 86 angularly extending above the base 70 and toward the center of the opening 76. An inwardly-directed V-shaped edge 88 is formed at the distal end 86 of the arm 80 for mating with the spokes 22 on the stud 12. Preferably, the arms 80 and 82 are slightly flexible in order to be pushed upwardly away from the opening 76 and to thus accommodate a stud having a larger diameter, yet are still able to sufficiently grip the stud. As an alternative to the arms 80 and 82 being flexible, or in combination therewith, the diameter of either the body 20 of the stud 12 or the spokes 22 themselves may gradually decrease as the stud 12 extends away from the structure 14. As a result, the engagement between the arms 80 and 82 of the punch-nut 18 and the spokes 22 of the stud 12 becomes tighter as the punch-nut 18 is lowered further onto the stud 12.

Preferably, when the housing 16 includes the projections 68, the punch-nut 18 comprises a plurality of barbs 90 for contacting or abutting against the projections 68. As shown, the barbs 90 are angularly-extending upwardly from outer sides of the base 70 and terminate at a tip 92. The barbs 90 extend across the gap provided between the outer side of the base 70 of the punch-nut 18 and the sidewall 76 of the housing 16, thereby reducing rattling between the housing 16 and the punch-nut 18.

Figure 7:
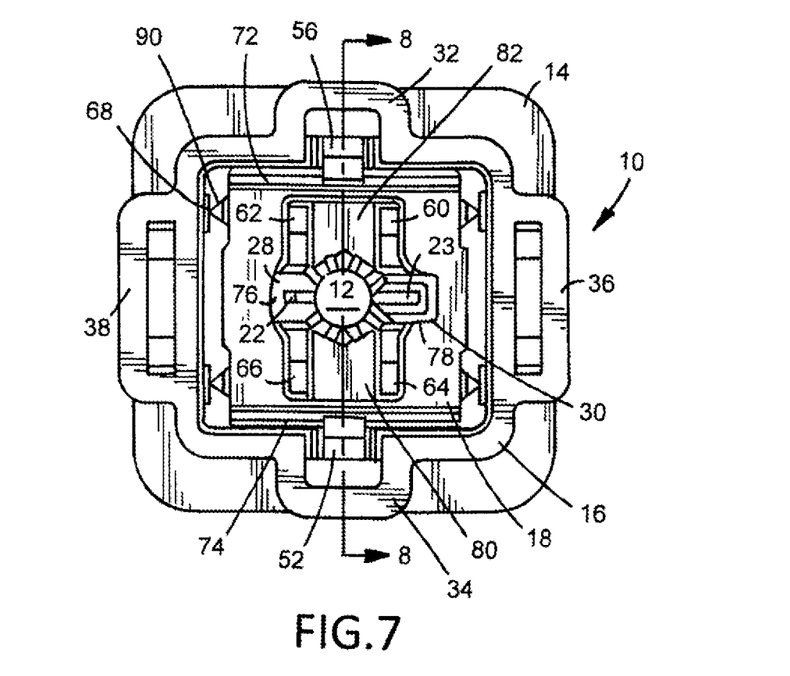
FIG. 7 is a top view of the cable fastening assembly according to the disclosed inventive concept.
Figure 8:
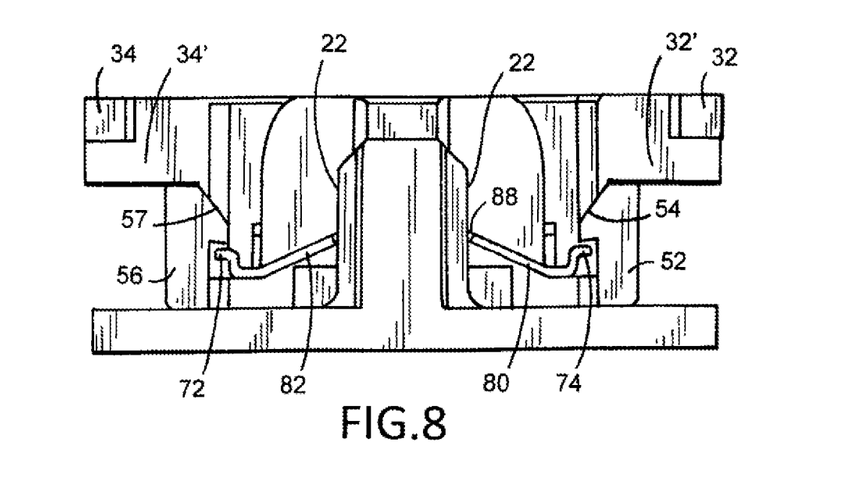
FIG. 8 is a cross-sectional view of the cable fastening assembly according to the disclosed inventive concept taken along line 8-8 of FIG. 7.

As shown in FIGS. 7 and 8, the assembly 10, which includes the housing 16 and the punch-nut 18, is assembled and mounted to the stud 12. While the legs 58 are not illustrated, it is to be understood that the disclosed inventive concept is not limited to the specific illustrated features.

With respect to FIG. 7, the punch-nut 18 is shown lowered onto the housing 16 and the ledges 72 and 74 are secured below the retaining fingers 52 and 56. As noted above, the punch-nut 18 is stabilized within the housing 16 due to the barbs 90 contacting the projections 68. Furthermore, the guiding ribs 60, 62, 64, and 66 extend upwardly through the opening 76 on opposite sides of the arms 80 and 82 in order to sandwich the arms 80 and 82 therebetween. As a result, when the assembly 10 is lowered onto the stud 12 such that the stud 12 extends through the openings 28 and 76 formed in the housing 16 and the punch-nut 18, respectively, the housing 16 and the punch-nut 18 are sufficiently secured thereon. The assembly 10 may be mounted onto the stud 12 by first lowering the housing 16 onto the stud 12 and then inserting the punch-nut 18 or, alternatively, the housing 16 and the punch-nut 18 may be initially connected and then jointly lowered onto the stud 12 as a unit.

As shown in FIG. 8, a cross-sectional view of the assembly 10 is shown mounted onto the stud 12. Specifically, the relation of the punch-nut 18 being secured under the retaining fingers 52 and 56 of the housing 16 is shown. As discussed above, when the punch-nut 18 is lowered onto the housing 16, the retaining fingers 52 and 56 are pushed outwardly as a result of downward pressure of the ledges 72 and 74 on respective sloped top surfaces 54 and 57. This is due to the fact that the retaining fingers 52 and 56 are specifically manufactured to provide a certain degree of flexibility with respect to the sidewall 26 of the housing 16. Once the ledges 72 and 74 are below the top surfaces 54 and 57 of the retaining fingers 52 and 56, the retaining fingers 52 and 56 snap back into their original position above the ledges 72 and 74, thereby securing the punch-nut 18 within the housing 16. The punch-nut 18 may be removed from the housing 16 by applying manual force to the retaining fingers 52 and 56 to move them outwardly and disengage the ledges 72 and 74 of the punch-nut 18. Thereafter, the punch-nut 18 is free to be lifted and removed from the housing 16.

Figure 9:
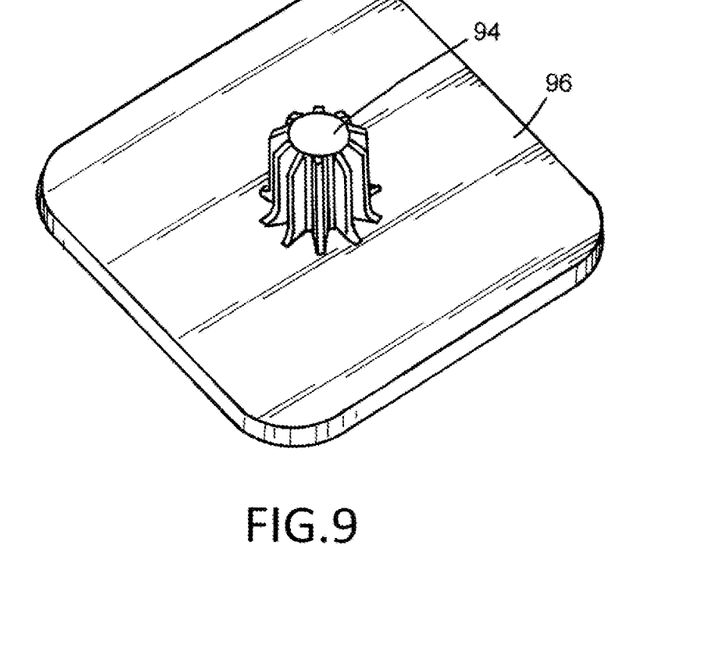
FIG. 9 is a perspective view of a stud having a plurality of radially-extending spokes, but without an anti-rotation key of the cable fastening assembly according to another embodiment of the disclosed inventive concept.
Figure 10:
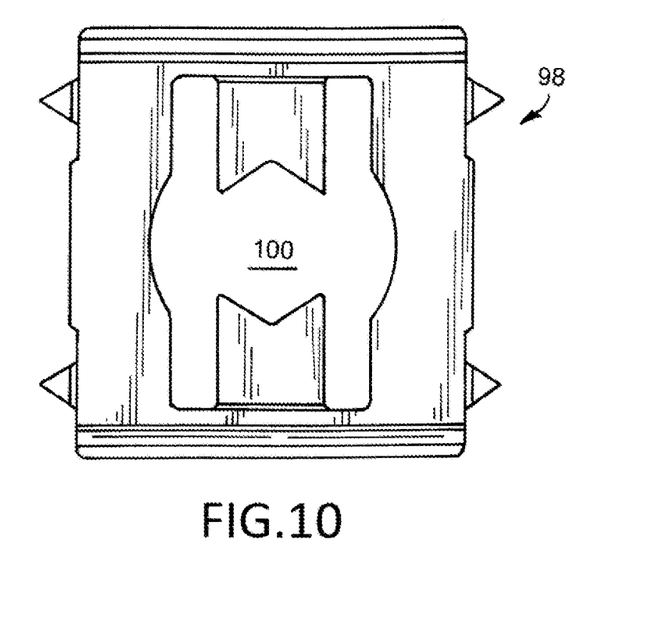
FIG. 10 is a top view of a punch-nut for use with the stud of FIG. 9 of the cable fastening assembly according to a further embodiment of the disclosed inventive concept.
Figure 11:
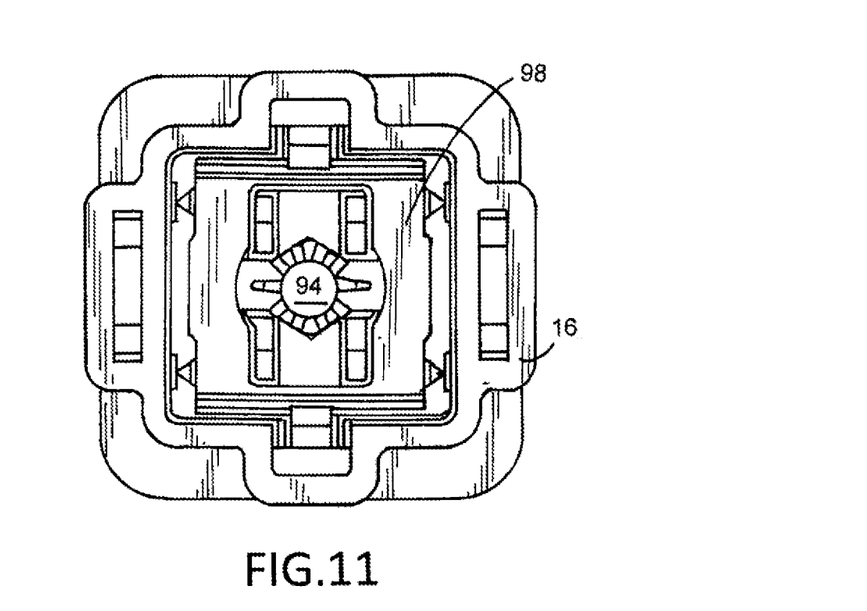
FIG. 11 is a top view of the cable fastening assembly according to the disclosed inventive concept utilizing the punch-nut of FIG. 10 and mounted to the stud of FIG. 9.

It is to be appreciated that the housing 16 is capable of utilizing interchangeable punch-nuts regardless of the configuration of the opening 76 formed therein so long as the opening 28 formed within the housing 16 aligns with the opening 76 formed within the punch-nut, as well as the ledges 72 and 74 aligning with the retaining fingers 52 and 56. This allows the housing 16 to be used with different studs. Thus, referring now to FIG. 9, a stud 94 without an anti-rotation key is shown fixed to a structure 96. As a result, the cutout 78 extending from the opening 76 formed in the base 70 of the punch-nut 18 is no longer required. In order to accommodate the stud 94, FIG. 10 illustrates another embodiment of a punch-nut 98 including an opening 100 formed therein without a cutout that can be used instead of the punch-nut 18 discussed above. Despite not including a cutout, all other features of the punch-nut 98 remain the same as those described above. FIG. 11 shows the punch-nut 98 secured within the housing 16 and mounted to the stud 94.

Figure 12:
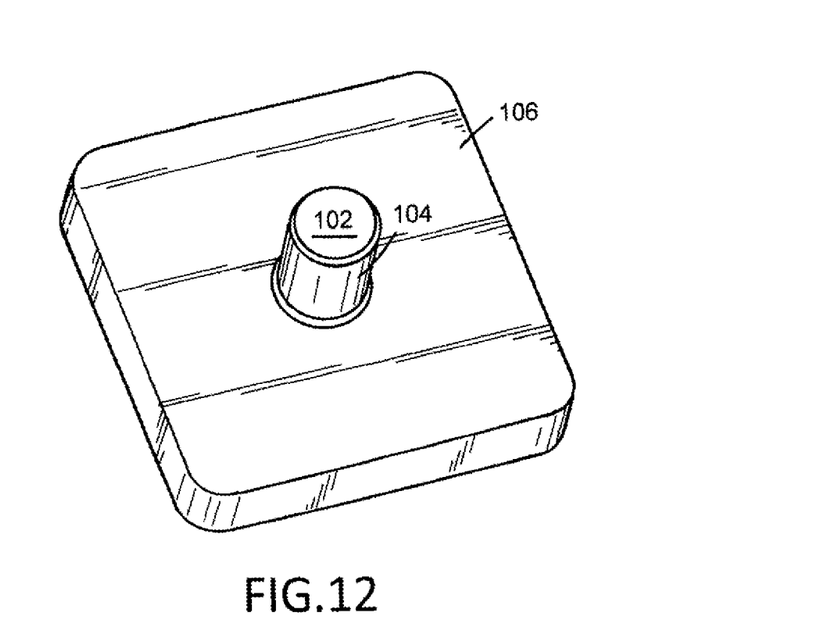
FIG. 12 is a perspective view of a stud without radially-extending spokes according to an additional embodiment the disclosed inventive concept.
Figure 13:
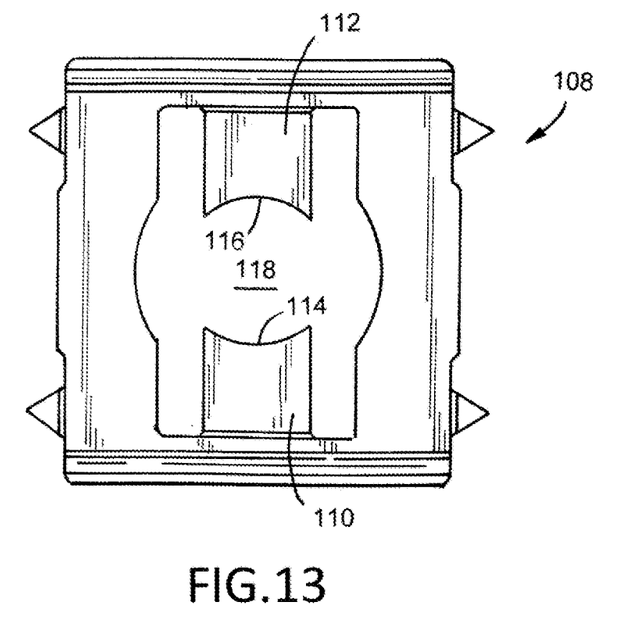
FIG. 13 is a top view of a punch-nut for use with the stud of FIG. 12 according to the disclosed inventive concept.
Figure 14:
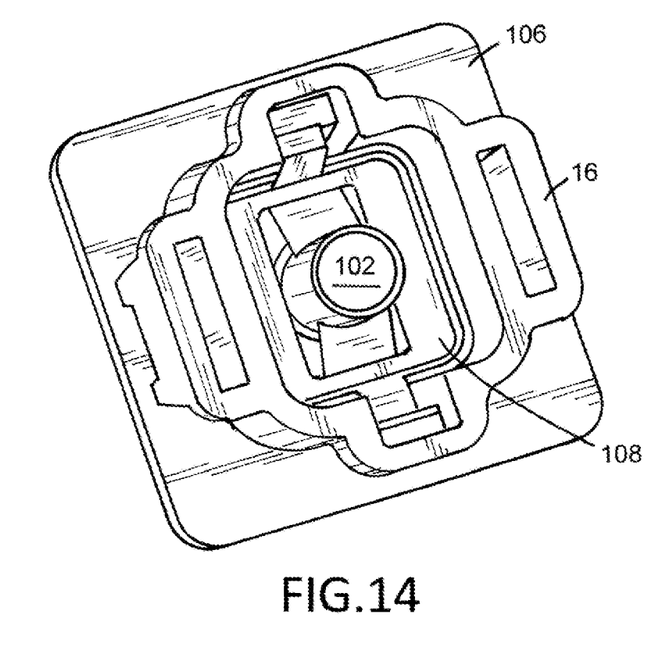
FIG. 14 is a perspective view of the cable fastening assembly according to the disclosed inventive concept utilizing the punch-nut of FIG. 13 and mounted to the stud of FIG. 12.

Furthermore, the disclosed inventive concept may be used to secure cables to a stud having no radially-extending spokes or anti-rotation key. As illustrated in FIG. 12, another stud 102 is shown having a smooth cylindrical body 104 and being fixed to a structure 106. Thus, a punch-nut 108 including a pair of arms 110 and 112 corresponding to the smooth body 104 of the stud 102, as shown in FIG. 13, is required. The punch-nut 108 is identical to the punch-nuts 18 and 98 described above, except for the fact that the pair of arms 110 and 112 has rounded or arcuate distal ends 114 and 116, respectively, which mate with the rounded body 104 of the stud 102. Additionally, the punch-nut 108 is shown having an opening 118 without a cutout for an anti-rotation key. However, it is to be understood that the punch-nut 108 may include a cutout formed in the opening to accommodate a stud having a rounded body and a key extending therefrom. As shown in FIG. 14, the punch-nut 108 is secured within the housing 16 in the same manner described above with respect to punch-nuts 18 and 98. Optionally, the stud 102 may have a gradually decreasing diameter as the stud 102 extends away from the structure 106. As a result, the engagement between the stud 102 and the punch-nut 108 becomes tighter as the punch-nut 108 is lowered further onto the stud 102. It is to be understood that the disclosed inventive concept is not limited to the specific punch-nuts described above and illustrated herein, but are merely shown for exemplary purposes.

Figure 15:
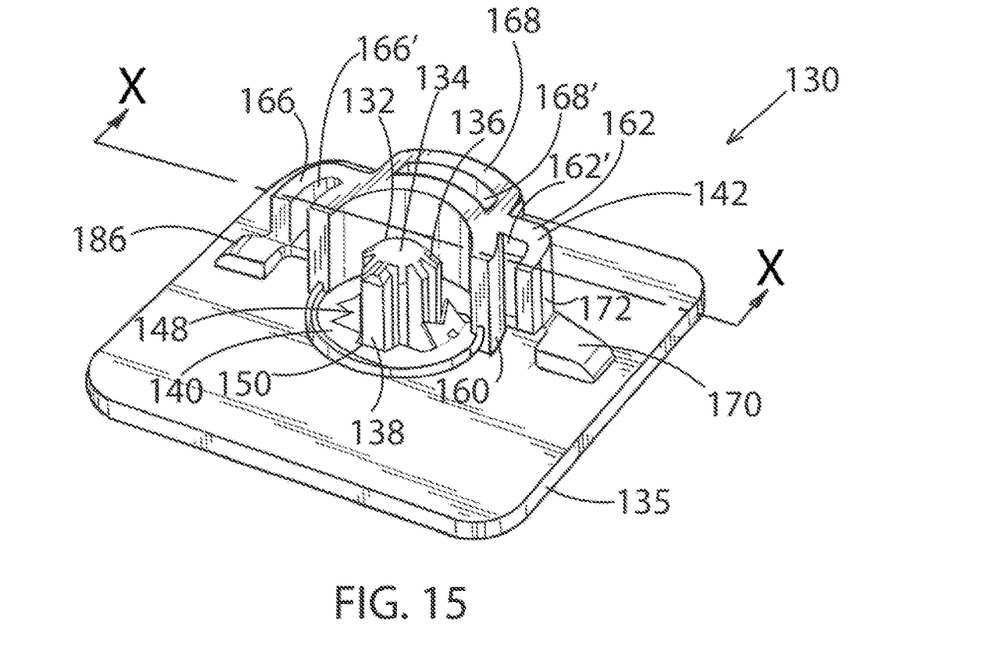
FIG. 15 is a partial perspective view of the cable fastening assembly according to an additional embodiment of the disclosed inventive concept.

With respect to FIGS. 15-20, an additional embodiment of the cable fastening assembly in accordance with the disclosed inventive concept is illustrated. As shown in FIG. 15, there is provided a cable fastening assembly 130 for securing a plurality of electrical cables or wires to a stud 132 fixed to a structure 135. The stud 132 includes a body 134 fixed to the structure 135 by any suitable means such as mechanical fastening, welding, soldering, adhesives, or the like. As shown, the stud 132 includes a plurality of radially-extending, circumferentially disposed spokes 136 and an anti-rotation key 138 extending outwardly therefrom and perpendicular to the body 134. It is to be understood that it is not critical to the operation of the disclosed inventive concept that the stud 132 include the anti-rotation key 138.

As shown, the assembly comprises a punch-nut 140 and a housing 142. The punch-nut 140 is initially lowered onto the stud 132 and, subsequently, the housing 142 is lowered onto the punch-nut 140. As described below, the punch-nut 140 is secured to the stud 132 and retains the housing 142 in position therewith.

Figure 16:
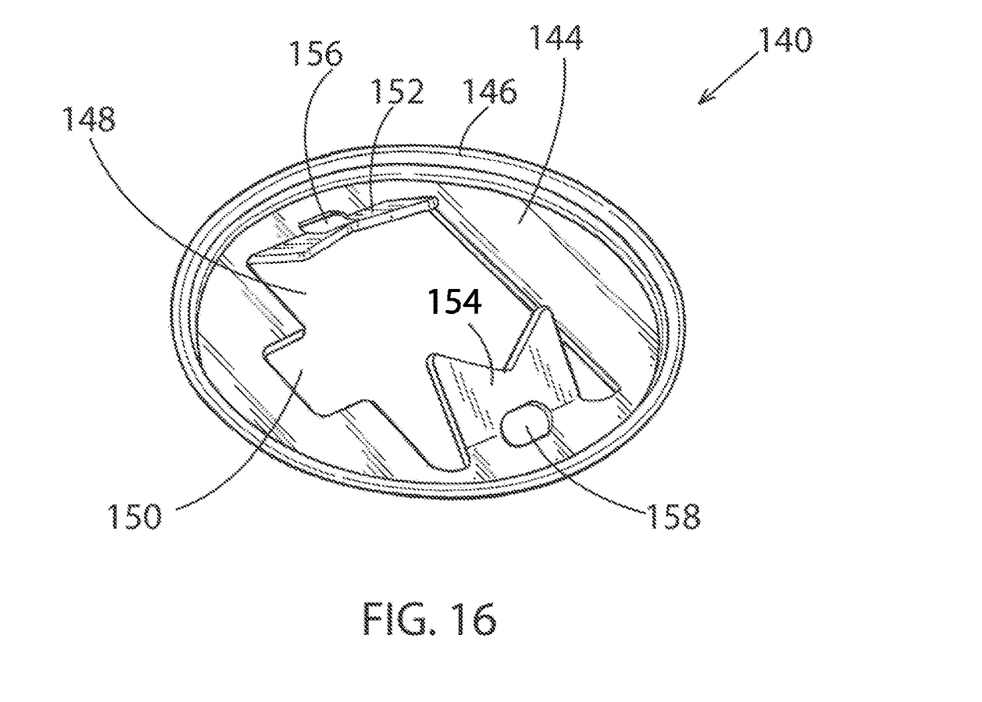
FIG. 16 is a perspective view of a punch-nut of the cable fastening assembly according to the disclosed inventive concept.
Figure 17:
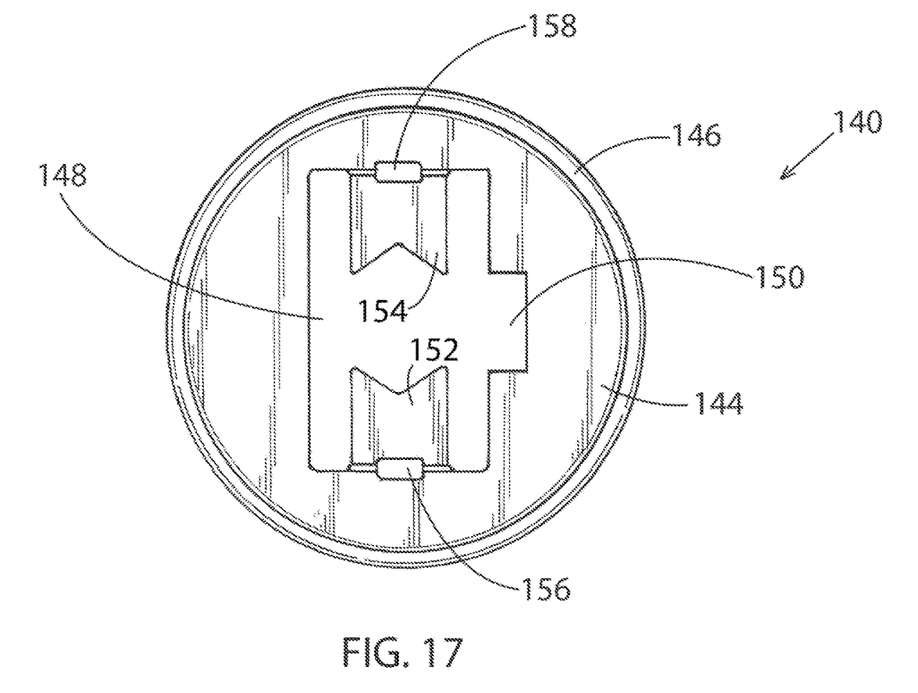
FIG. 17 is a top view of the punch-nut of the cable fastening assembly according to the disclosed inventive concept.

With more particularity, as shown in FIGS. 16 and 17, the punch-nut 140 includes a base 144 and a curved flange 146 extending upwardly from the outer perimeter of the base 144. The base 144 includes an opening 148 formed therein for receiving the stud 132. The opening 148 may include a cutout 150 formed therein for receiving the anti-rotation key 138 of the stud 132. However, the cutout 150 is not required when the stud 132 does not include the anti-rotation key 138.

The punch-nut 140 further comprises a pair of inwardly-directed arms 152 and 154 extending from the opposite outer edges of the opening 148 formed in the base 144. The arms 152 and 154 are configured to contact the stud 132 and retain the punch-nut 140 in position with respect thereto. The arms 152 and 154 are identical to one another and, similar to the arms described in the above embodiments, the arms 152 and 154 may have either V-shaped or rounded distal ends. A pair of apertures 156 and 158 may be formed at the intersection of each of the arms 152 and 154 and the base 144. The apertures 156 and 158 provide increased flexibility when positioning the punch-nut 140 onto the structure 135 and engaging the stud 132.

Figure 18:
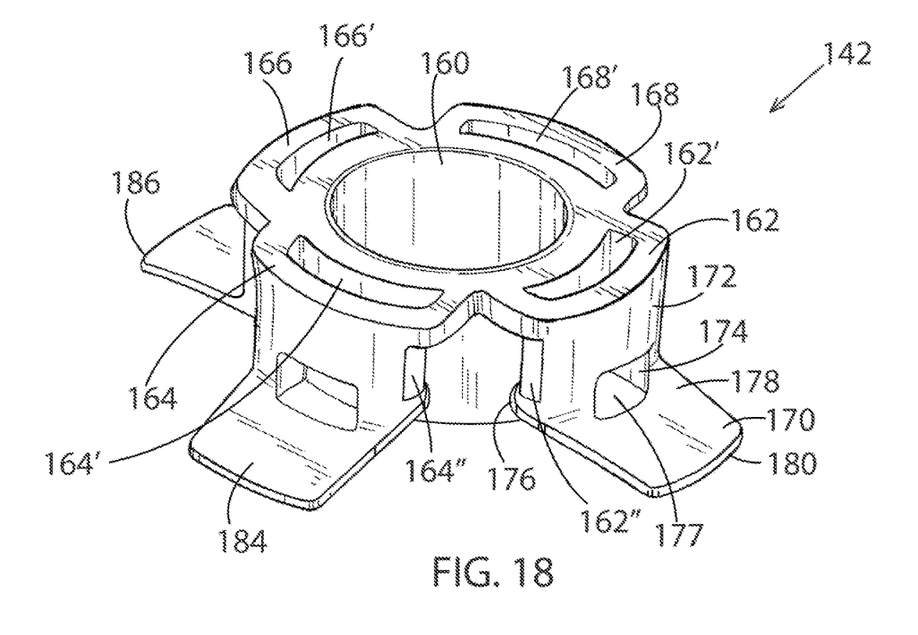
FIG. 18 is a perspective view of a housing of the cable fastening assembly according to the disclosed inventive concept.
Figure 19:
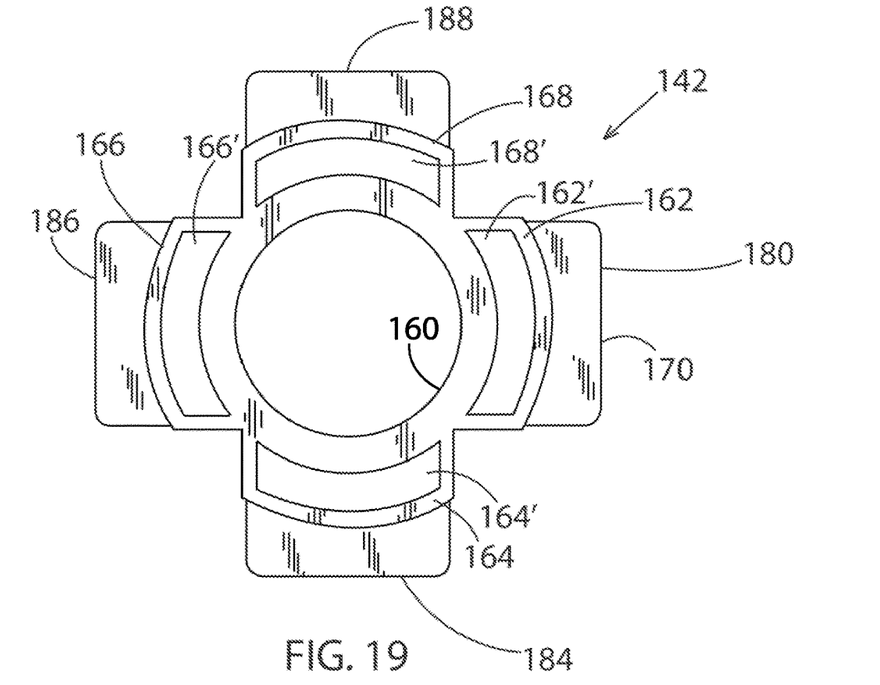
FIG. 19 is a top view of the housing of the cable fastening assembly according to the disclosed inventive concept.

The housing 142 is illustrated in FIGS. 18 and 19. The housing 142 comprises a sidewall 160, at least one attachment member 162 extending from the sidewall 160, and at least one resilient leg 170 extending from the attachment member 162. At least one passageway 162' is formed between the sidewall 160 and the attachment member 162. The passageway 162' allows for a cable tie (not shown) to be attached to the attachment member 162. By attaching the cable tie, a plurality of cables (not shown) may be secured to the attachment member 162. As shown, the attachment member 162 includes an extension 172 and a pair of spaced apart shoulders 174 and 176 interconnecting the extension 172 and the sidewall 160. Thus, a second passageway 162" is formed between the sidewall 160 and the extension 172 and perpendicular to the first passageway 162'. An opening 177 is formed in the bottom of the extension 172 and ensures that the first passageway 162' is not obstructed.

Preferably, the housing 142 includes a plurality of attachment members 162, 164, 166, and 168 each extending from the sidewall 160 and equally spaced apart from one another. Each attachment member 162, 164, 166, and 168 may be identical in structure. Thus, the attachment member 164 may include a first passageway 164' and a second passageway 164", the attachment member 166 may include a first passageway 166' and a second passageway 166", and the attachment member 168 may include a first passageway 168' and a second passageway 168".

With respect to the leg 170 of the housing 142, the leg 170 includes a proximal end 178 and a distal end 180. The proximal end 178 of the leg 170 is flexibly secured to the extension 172 of the attachment member 162. The leg 170 is downwardly angled with respect to the extension 172 and extends to a horizontal plane lower than the sidewall 160 of the housing 142. This allows the leg 170 to initially contact the structure 130 instead of the sidewall 160 of the housing 142 itself. As noted above, an opening 177 is provided at the point of intersection between the attachment member 162 and the leg 170. This provides access to the first passageway 162' in the attachment member 162 so that a cable tie can be secured thereto without being obstructed by the leg 170.

Preferably, when the housing 142 includes a plurality of attachment members 162, 164, 166, and 168, each attachment member 162, 164, 166, and 168 includes an associated leg 170, 184, 186, and 188. As a result, each leg 170, 184, 186, and 188 provides equal support around the perimeter of the housing 142 when placed on the structure 135.

Figure 20:
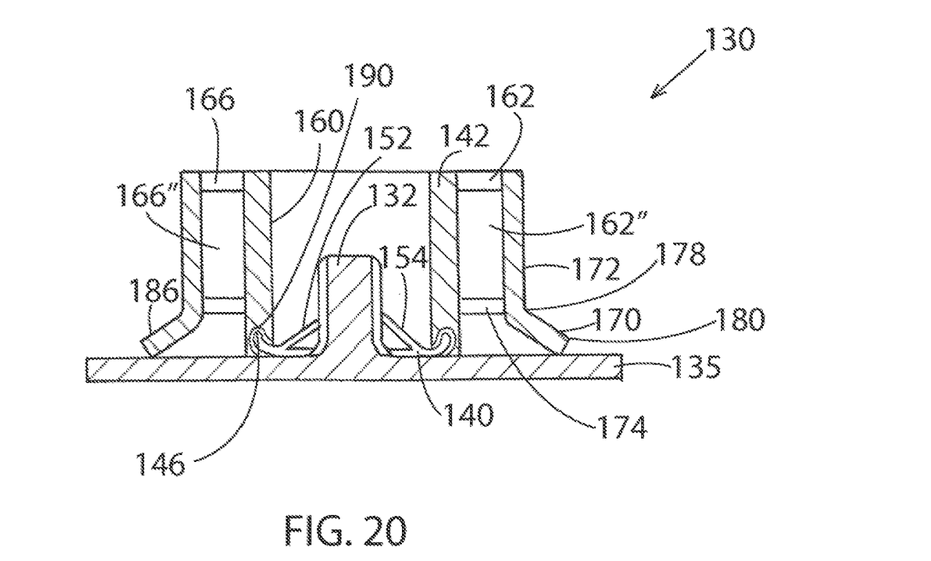
FIG. 20 is a cross-sectional view of the cable fastening assembly according to the disclosed inventive concept taken along line X-X of FIG. 15.

Now, with reference to FIGS. 15 and 20, the punch-nut 140 and the housing 142 are both shown secured in position on the stud 132. In use, and contrary to the cable fastening assembly 10 described above, the punch-nut 140 is initially placed onto the structure 135 with the stud 132 extending through the opening 148 formed in the punch-nut 140. The arms 142 and 154 of the punch-nut 140 engage the spokes 136 of the stud 132, thereby securing the punch-nut 140 in position. Thereafter, the housing 142 is lowered onto the punch-nut 140 such that the sidewall 160 thereof surrounds the stud 132.

As shown in FIG. 20, the sidewall 160 of the housing 142 includes a groove 190 formed therein that extends entirely along the lower edge of the sidewall 160. The groove 190 is specifically formed to receive the flange 146 of the punch-nut 140 and be secured thereto either by being frictionally secured, snap-fitted, or the like. Thus, the housing 142 is secured to the structure 135 as it comes into contact with the punch-nut 140. Upon the housing 142 being lowered onto the structure 135, the legs 170, 184, 186, and 188 thereof engage the structure 135 to provide a resilient and secure connection therewith.

From the above, it is to be appreciated that a new and unique cable fastening assembly having interchangeable components for securing a plurality of cables to various studs having different configurations is set forth herein. The cable fastening assembly of the disclosed inventive concept provides a number of advantages over known cable fastening assemblies including low cost, easy installation, and a high degree of adaptability.

One skilled in the art will readily recognize from such discussion, and from the accompanying drawings and claims, that various changes, modifications, and other variations can be made therein without departing from the spirit and fair scope of the disclosed inventive concept as defined by the following claims. As such, the disclosed inventive concept is not limited to those specific embodiments described and illustrated herein. It is to be understood that one of ordinary skill in the art would combine components from various embodiments as necessary although such combination may not be specifically illustrated.

What is claimed is:

1. A cable fastening assembly for securing cables to a stud, the assembly comprising:

a housing including a base and a sidewall, said base including an opening formed therein for receiving the stud, said opening including a cutout portion for receiving an anti-rotation key formed on the stud, and said sidewall having at least one attachment member formed thereon; and a punch-nut including a base and an opening formed therein for receiving said stud and retaining said housing on said stud.

2. The cable fastening assembly of claim 1, wherein said at least one attachment member includes a pair of perpendicular passageways formed therein for securing an associated cable tie within each of said passageways.

3. The cable fastening assembly of claim 1, wherein said at least one attachment member comprises a plurality of spaced apart attachment members.

4. The cable fastening assembly of claim 1, wherein said housing further comprises a plurality of spaced apart resilient legs.

5. The cable fastening assembly of claim 1, wherein said opening formed in said base of said punch-nut includes a cutout portion for receiving the anti-rotation key formed on the stud.

6. The cable fastening assembly of claim 1, wherein said punch-nut further comprises a pair of opposing arms extending inwardly toward the center of said punch-nut and terminating at a distal end for contacting the stud and securing said punch-nut thereto.

7. The cable fastening assembly of claim 6, wherein said housing further comprises a plurality of spaced apart guiding ribs positionable through said opening formed in said punch-nut and on opposite sides of said pair of arms.

8. The cable fastening assembly of claim 6, wherein said distal end of each of said pair of arms has an inwardly-directed V-shaped edge for engaging a plurality of radially-extending spokes formed on the stud and securing said punch-nut to the stud.

9. The cable fastening assembly of claim 6, wherein said distal end of each of said pair of arms has an arcuate edge for engaging a rounded surface of the stud and for securing said punch-nut to the stud.

10. The cable fastening assembly of claim 1, wherein said housing further comprises at least one retaining finger for engaging said punch-nut and securing said punch-nut to said housing.

11. The cable fastening assembly of claim 1, wherein said housing further comprises a plurality of spaced apart projections.

12. The cable fastening assembly of claim 11, wherein said punch-nut further comprises a plurality of spaced apart barbs for abutting against said plurality of projections on said housing to provide a secure attachment therebetween.

13. A cable fastening assembly for securing a cable to a structure, the assembly comprising:

a stud fixed to the structure;

a housing including a base and a sidewall, said base including an opening formed therein for receiving said stud, said opening including a cutout portion for receiving an anti-rotation key formed on the stud, and said sidewall having at least one attachment member formed thereon; and a punch-nut including a base and an opening formed therein for receiving said stud and retaining said housing on said stud.

14. The cable fastening assembly of claim 13, further comprising:

a plurality of radially-extending spokes circumferentially formed on said stud; and a pair of arms extending inwardly from said punch-nut, each of said arms terminating at an inwardly-directed V-shaped edge, wherein said pair of arms matingly engages said stud for securing said punch-nut thereto.

15. The cable fastening assembly of claim 13, wherein said at least one attachment member comprises a pair of perpendicular passageways formed therein for securing an associated cable tie within each of said passageways.

16. A method for securing a cable to a stud comprising the steps of:

forming a punch nut having a stud-passing opening and a housing having a stud-passing opening and a cable receiving portion, said stud-passing opening including a cutout portion for receiving an anti-rotation key formed on the stud;

inserting said housing onto the stud;

inserting said punch-nut onto the stud, thereby securing said housing on the stud;

attaching at least one cable tie to said cable receiving portion of said housing; and tightening said a cable tie around said cable.

17. The method of claim 16, wherein said housing further comprises a plurality of spaced apart attachment members for attaching a plurality of cable ties thereto.

18. The method of claim 17, wherein each of said plurality of attachment members includes a pair of perpendicular passageways formed therein for arranging cables along two different axes.

19. The method of claim 16, wherein the stud includes said anti-rotation key formed thereon and further wherein said housing and said punch-nut each includes said cutout portion formed in the respective openings thereof for receiving said anti-rotation key on the stud.

* * * * *